United States Patent
Maier et al.

(10) Patent No.: US 12,018,811 B2
(45) Date of Patent: Jun. 25, 2024

(54) LIGHTING DEVICE FOR A MOTOR VEHICLE

(71) Applicant: ZKW Group GmbH, Wieselburg (AT)

(72) Inventors: Christian Maier, Oberndorf an der Melk (AT); Tuncay Firat, St. Pölten (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 17/921,435

(22) PCT Filed: Apr. 20, 2021

(86) PCT No.: PCT/EP2021/060168
§ 371 (c)(1),
(2) Date: Oct. 26, 2022

(87) PCT Pub. No.: WO2021/223999
PCT Pub. Date: Nov. 11, 2021

(65) Prior Publication Data
US 2023/0160555 A1 May 25, 2023

(30) Foreign Application Priority Data

May 4, 2020 (EP) ..................................... 20172744

(51) Int. Cl.
*F21S 43/20* (2018.01)
*F21S 41/24* (2018.01)
(Continued)

(52) U.S. Cl.
CPC ............... *F21S 43/26* (2018.01); *F21S 41/24* (2018.01); *F21S 43/237* (2018.01); *F21S 43/251* (2018.01)

(58) Field of Classification Search
CPC ........ F21S 43/26; F21S 43/237; F21S 43/251; F21S 41/24
See application file for complete search history.

(56) References Cited

U.S. PATENT DOCUMENTS 10,895,361 B1 * 1/2021 Crespin ................ B60Q 1/2607
11,441,754 B1 * 9/2022 Johnson ................ F21S 43/241
(Continued)

OTHER PUBLICATIONS

International Search Report for PCT/EP2021/060168, dated Jun. 23, 2021 (11 pages).
(Continued)

*Primary Examiner* — Christopher E Dunay
(74) *Attorney, Agent, or Firm* — Eversheds Sutherland (US) LLP

(57) ABSTRACT

A lighting device (1) for a motor vehicle, including a light source (2), a light conductor (3) having a first region (3a) and a curved region (3b), a first optical element (4) having a light entry surface, which comprises a first portion (4a) and a second portion (4b), wherein the first optical element (4) is arranged relative to the light conductor (3) in such a manner that light, which is decoupled from the first region (3a) of the light conductor (3), impinges on the first portion (4a) of the light entry surface of the first optical element (4), and light, which is decoupled from the curved region (3b) of the light conductor (3), impinges on a part region of the second portion (4b) of the light entry surface of the first optical element (4), wherein the lighting device (1) comprises a second optical element (5), which is arranged between the curved region (3b) of the light conductor (3) and the second portion (4b) of the light entry surface of the first optical element (4) in such a manner and equipped in order to redirect light, which is decoupled from the curved region (3b) of the light conductor (3) in such a manner that the light, having passed through the second optical element (5), impinges on the entire second portion (4b) of the light entry surface of the first optical element (4).

15 Claims, 2 Drawing Sheets

Figure 1:
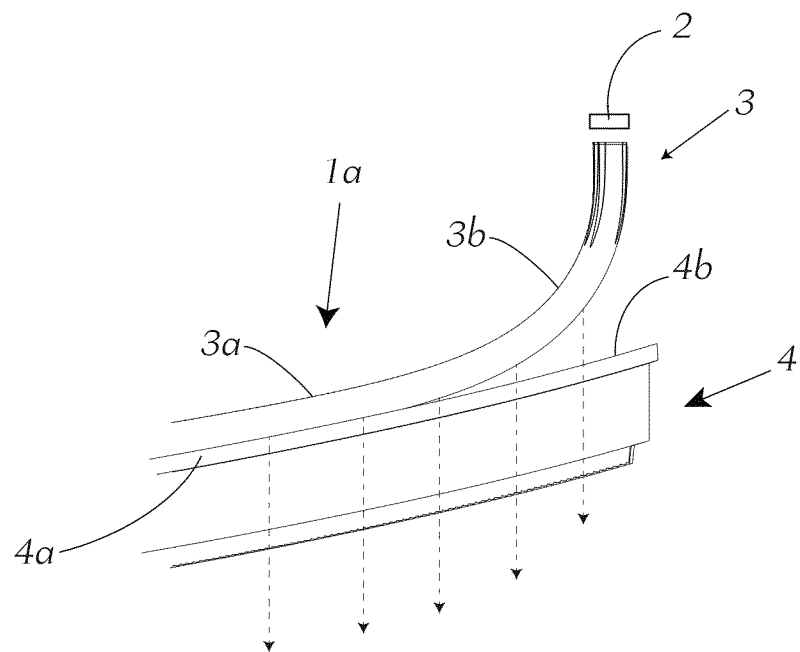

(51) Int. Cl.
    *F21S 43/237*     (2018.01)
    *F21S 43/251*     (2018.01)

(56) References Cited

U.S. PATENT DOCUMENTS

| | | |
|---|---|---|
| 2019/0195461 A1 | 6/2019 | Terada |
| 2019/0271447 A1 | 9/2019 | Choo et al. |
| 2019/0285791 A1 | 9/2019 | Gloss et al. |
| 2022/0128213 A1* | 4/2022 | Kim .................. F21S 43/26 |
| 2022/0397252 A1* | 12/2022 | Kikuchi .............. F21S 43/245 |
| 2023/0010327 A1* | 1/2023 | Michaelis ............ F21S 43/26 |
| 2023/0028522 A1* | 1/2023 | Heitjohann ........... F21S 43/40 |

OTHER PUBLICATIONS

Search Report for European Patent Application No. 20172744.3, dated Oct. 23, 2020 (5 pages).

* cited by examiner

LIGHTING DEVICE FOR A MOTOR VEHICLE

The invention relates to a lighting device for a motor vehicle, or for a motor vehicle headlamp system, wherein the lighting device includes the following:
- a light source for generating and emitting light,
- a light conductor, wherein the light of the light source is coupled into the light conductor and decoupled at a decoupling surface of the light conductor, wherein the light conductor comprises a first region and a curved region following the first region, wherein the decoupling surface extends over the first region and the curved region and is designed in such a manner that the light rays, following the decoupling from the first region, are oriented parallel to one another,
- a first optical element having a light entry surface, which comprises a first portion and a second portion adjoining the first portion, wherein the first optical element is arranged relative to the light conductor in such a manner that light, which is decoupled from the first region of the light conductor, impinges on the first portion of the light entry surface of the first optical element and light, which is decoupled from the curved region of the light conductor, impinges on a part region of the second portion of the light entry surface of the first optical element.

Further, the invention relates to a motor vehicle headlamp system.

In addition, the invention relates to a motor vehicle having a lighting device or a motor vehicle headlamp system.

From DE 10 2018 130 425 A1 a lighting device is known, which includes a straight and a curved light conductor, wherein each light conductor is assigned a light source and radiates light into the relevant light conductor. When a region is to be now illuminated with the lighting device, the first light source illuminates by means of the straight light conductor, a first portion of the region and a second light source by means of the curved light conductor, a second portion of the region.

Disadvantageously, two light sources and two light conductors have to be used in DE 10 2018 130 425 A1 in order to completely illuminate the entire region. This leads to high costs and a more complex design of the lighting device.

However, the invention sets itself the objective of creating a lighting device with which the disadvantages of the prior art are mitigated.

This object is solved through a lighting device having the features of claim 1. Preferred embodiments are stated in the dependent claims.

According to the invention, the lighting device comprises a second optical element which is arranged between the curved region of the light conductor and the second portion of the light entry surface of the first optical element in such a manner and equipped in order to redirect light, which is decoupled from the curved region of the light conductor, in such a manner that the light, having passed through the second optical element, impinges on the entire second portion of the light entry surface of the first optical element.

This results in the advantage that with a light source, which preferentially includes a single light source, the entire light entry surface of the first optical element can be illuminated, in particular the entire edge region or outer region of the light entry surface. The first region of the light conductor can be formed straight or have a curvature, wherein in this case the curvature of the first region is preferentially smaller than the curvature of the curved region of the light conductor. The second optical element is preferentially equipped in order to redirect the light, which is emitted from the curved region of the light conductor in a radial or non-parallel manner, on the one hand in the direction of the entire second portion of the light entry surface of the first optical element so that the second portion is completely illuminated and on the other hand to parallelize the light rays on exiting the second optical element. Following the exit from the second optical element in particular in the vertical and horizontal direction, the light rays are oriented parallel to one another. Following the exit from the second optical element, the light rays are oriented orthogonally to the first and/or second portion of the light entry surface. The light entry surface can have a step-shaped structure, wherein the light rays, after the exit from the second optical element, are preferably oriented orthogonally to those step portions arranged parallel to one another, which are oriented substantially parallel to the first region of the light conductor.

It can be provided that the first region of the light conductor and the first portion of the optical element are oriented substantially parallel to one another. Because of this, light, which is emitted from the first region of the light conductor, can be particularly efficiently radiated into the first portion of the first optical element.

It can be provided that the light rays, after the decoupling from the light conductor, are oriented orthogonally to the first region of the light conductor and/or preferentially orthogonally to the light entry surface of the first optical element. The light conductor can be configured elongate or cylindrical, wherein the light rays are preferentially decoupled from the light conductor orthogonally to the longitudinal extension or to the cylinder axis. After the decoupling, the light rays are preferably oriented in the x-direction, wherein the x-direction corresponds to a longitudinal axis of a motor vehicle which comprises the lighting device.

It can be provided that light which is decoupled from the first region of the light conductor exclusively impinges on the first portion of the light entry surface of the first optical element. In other words, light which exits from the first region of the light conductor, does not impinge on the entire second portion of the light entry surface of the first optical element.

It can be provided that the second optical element, on a surface facing the curved region of the light conductor, comprises entry optics which are equipped in order to redirect the light, which is decoupled from the curved region of the light conductor, in the direction of the second portion of the first optical element upon entering the second optical element. The entry optics can be formed as facets which extend in a regular grid over the surface facing the curved region of the light conductor. The entry optics are equipped in particular in order to redirect the light rays in such a manner that following the exit from the second optical element they illuminate the entire second portion of the first optical element.

It can be provided that the second optical element, on a surface facing the first optical element, comprises exit optics which are equipped in order to redirect the light upon exit from the second optical element in such a manner that the light rays exiting from the second optical element are oriented parallel to the light rays decoupled from the first portion of the light conductor. The exit optics can be configured as facets, which parallelize the light rays upon exiting.

It can be provided that the second optical element is substantially configured prism-like, wherein preferentially a first surface of the prism faces the curved region of the light conductor and a second surface of the prism of the light entry surface faces the second portion of the first optical element. The second optical element can also be configured wedge-shaped. In particular, the second optical element fills at least partially or completely the space which is located between the curved region of the light conductor and the second portion of the first optical element. By way of this, a particularly compact and space-saving design can be achieved.

It can be provided that the light conductor and the second optical element are spaced apart from one another and/or the first optical element and the second optical element are spaced apart from one another. This results in the advantage that the optically active surfaces are not damaged by an undesirable contact, for example because of vibrations.

It can be provided that a surface of the second optical element facing the light conductor has a curvature which is substantially equal to the curvature of the curved region of the light conductor. The distance between the surface of the second optical element facing the light conductor and the curved region can be constant.

It can be provided that a surface of the second optical element facing the first optical element is arranged substantially parallel to the light entry surface of the first optical element.

It can be provided that the first optical element is equipped in order to produce a light function, in particular a signal light function. For example, a side marker lamp, a daytime running light, a direction indicator or a position light for a motor vehicle can be provided with the lighting device. The light, which exits the first optical element, is preferentially emitted in the HV direction.

It can be provided that the second optical element is formed as a transparent solid body. Alternatively to this, the second optical element can be formed as a hollow body.

It can be provided that the curved region of the light conductor and the second optical element are formed in one piece. In this case, the light conductor and the second optical element can comprise different material, wherein the two materials can have a different refractory index. At the boundary surface between the curved region of the light conductor and the second optical element, refraction of the light in the direction of the second portion of the light entry surface of the first optical element can occur, so that the entire second portion, after the exit from the second optical element, is illuminated. The curved region of the light conductor and the second optical element can also be produced in one piece and from the same material. Alternatively to this it can be provided that the first optical element and the second optical element are formed in one piece.

According to the invention, a motor vehicle headlamp system is provided, including at least one, preferentially two, motor vehicle headlamps and a lighting device, wherein preferentially the lighting device is arranged between the two motor vehicle headlamps. This produces the advantage that for example on a front side of a motor vehicle, which comprises the motor vehicle headlamp system, a signal function can be produced with the lighting device in addition to the light of the two headlamps. This signal light function can be emitted above or below and/or between the two headlamps. Alternatively to this, the motor vehicle headlamp system can include at least one, preferentially two, motor vehicle headlamps, wherein the lighting device can be arranged for example within, preferentially on an edge region, of the motor vehicle headlamp, in order to provide an additional light function for the motor vehicle headlamp.

It can be provided that the light conductor of the lighting device has a first and a second end, wherein at each end light is coupled into the light conductor by means of a light source.

According to the invention, a motor vehicle, having a lighting device, or a motor vehicle headlamp system, including at least one, preferentially two, motor vehicle headlamp and a lighting device as described above is provided.

Figure 2A:
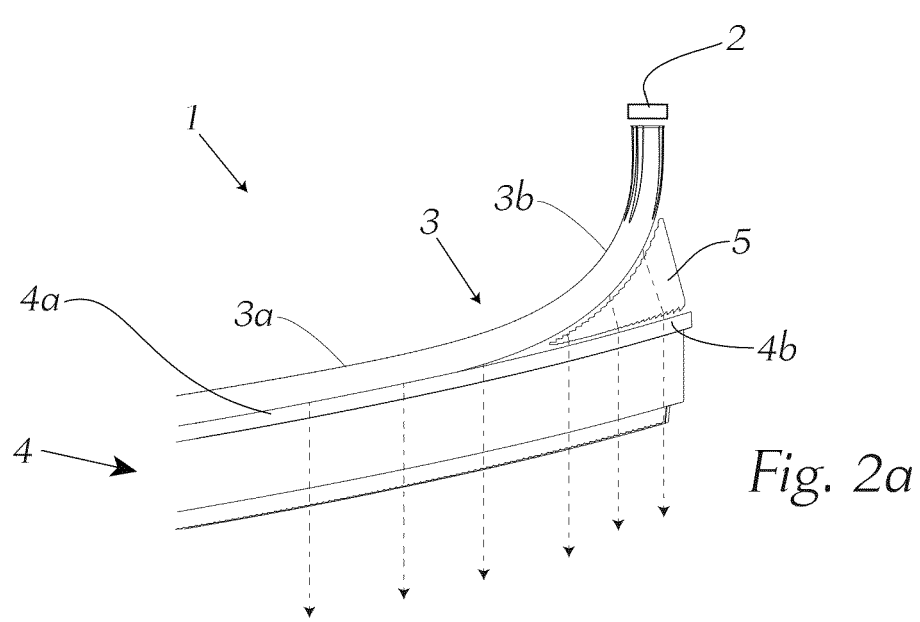
Figure 2B:
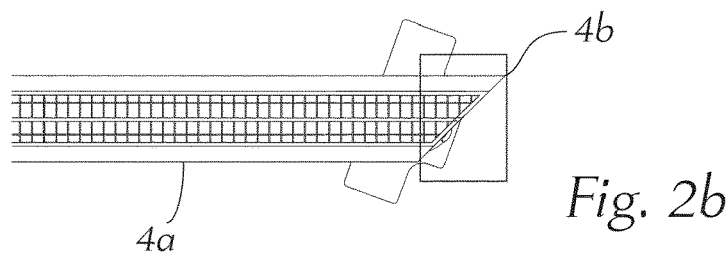
Figure 3:
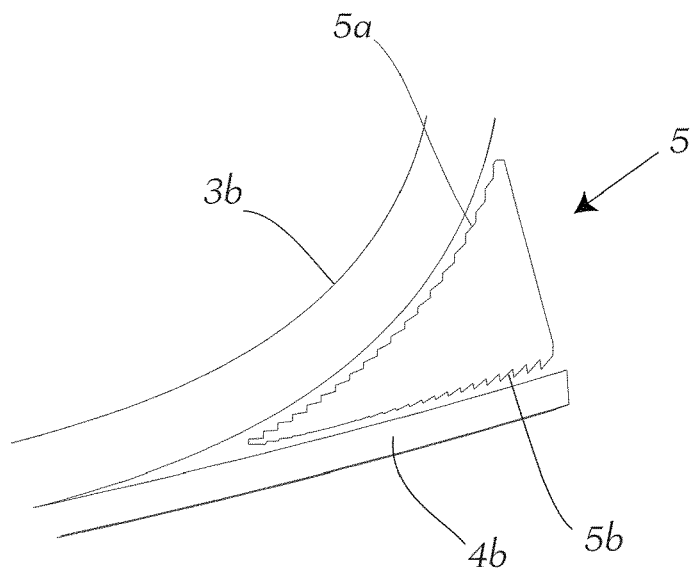
Figure 4:
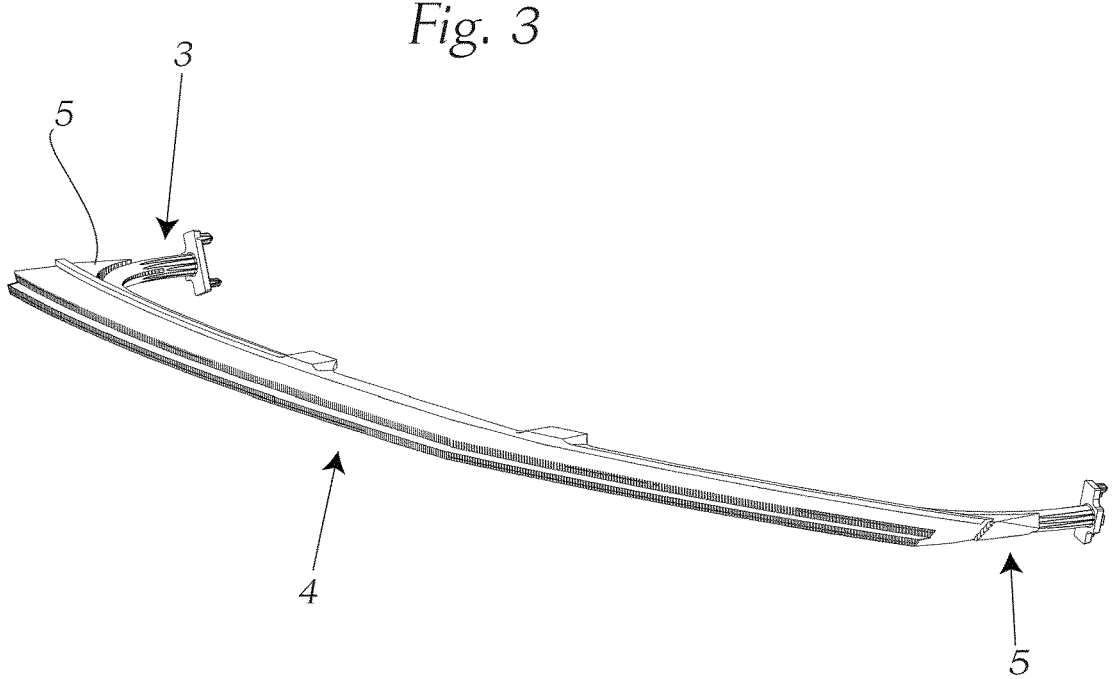

In the following, the invention is additionally explained further by way of a preferred exemplary embodiment to which however it shall not be restricted. In the drawings it shows:

FIG. 1 a detailed view of a lighting device according to the prior art;

FIGS. 2a, 2b and 3 detail views of a lighting device according to the invention;

FIG. 4 a second embodiment of a lighting device according to the invention.

FIG. 1 shows an extract of a lighting device 1a for a motor vehicle according to the prior art. The lighting device 1a includes a light source 2 for generating and emitting light and a light conductor 3, wherein the light of the light source 2 is coupled into the light conductor 3 and decoupled on a decoupling surface of the light conductor 3. The light conductor 3 has a first region 3a and a curved region 3b following the first region 3a. The decoupling surface extends over the first region 3a and the curved region 3b. The light conductor is formed in such a manner that the light rays, following the decoupling from the first region 3a, are oriented parallel to one another. The lighting device 1a includes a first optical element 4 having a light entry surface, which comprises a first portion 4a and a second portion 4b adjoining the first portion. The first optical element 4 is arranged relative to the light conductor 3 in such a manner that light, which is decoupled from the first region 3a of the light conductor 3, impinges on the first portion 4a of the light entry surface of the first optical element 4. Light, which is decoupled from the curved region 3b of the light conductor 3, merely impinges on a part region of the second portion 4b of the light entry surface of the first optical element 4.

Following the decoupling from the first region 3a of the light conductor 3, the light rays are oriented orthogonally to the first region 3a of the light conductor 3 and orthogonally to the light entry surface 4a, 4b of the first optical element 4. Following the decoupling, the light rays can also be oriented in the x-direction. Light, which is decoupled from the first region 3a of the light conductor 3, exclusively impinges on the first portion 4a of the light entry surface of the first optical element 4 and can also illuminate a part region of the second portion 4b. Thus, because of the curvature of the light conductor, the second portion 4b of the light entry surface is disadvantageously not completely illuminated.

FIG. 2a, 2b and in detail FIG. 3 show a lighting device 1 according to the invention. The lighting device 1 comprises the components of the lighting device 1a and additionally includes a second optical element 5, which is arranged between the curved region 3b of the light conductor 3 and the second portion 4b of the light entry surface of the first optical element 4 and equipped in order to redirect light, which is decoupled from the curved region 3b of the light conductor 3, in such a manner that the light, having passed through the second optical element 5, impinges on the entire second portion 4b of the light entry surface of the first optical element 4. The first region 3a of the light conductor 3 and the first portion 4a of the first optical element 4 are oriented substantially parallel to one another. The second optical element 5 has, on a surface 5a facing the curved region 3b of the light conductor 3, entry optics, which are equipped in order to redirect the light, which is decoupled from the curved region 3b of the light conductor 3, in the direction of the second portion 4b of the first optical element 4 upon entry into the second optical element 5.

The second optical element 5 has, on a surface 5b facing the first optical element 4, exit optics which are equipped in order to redirect the light on exiting the second optical element 5 in such a manner that the light rays exiting the second optical element 5 are oriented parallel to the light rays decoupled from the first portion 3a of the light conductor 3.

The second optical element 5 can be configured substantially prism-like, wherein a first surface of the prism faces the curved region 3b of the light conductor 3 and a second surface of the prism faces the light entry surface of the second portion 4b of the first optical element 4. The surface 5a of the second optical element 5 facing the light conductor 3 has a curvature which is substantially equal to the curvature of the curved region 3b of the light conductor 3. The surface 5b of the second optical element 5 facing the first optical element 4 is oriented substantially parallel to the light entry surface 4a, 4b of the first optical element 4. In the shown exemplary embodiment, the second optical element 5 is spaced apart from the first optical element 4 and the light conductor 3.

FIG. 2b shows a view of the light entry surfaces 4a, 4b. The light entry surfaces 4a, 4b can have a step-shaped structure.

FIG. 4a shows a view of a second embodiment of the lighting device 1. In this embodiment, the light conductor 3 has a first and a second end, wherein at each end light is coupled into the light conductor 3 by means of a light source 2, wherein the light after the decoupling from the light conductor is emitted onto the light entry surface of the first optical element 4. The first and the second end of the light conductor 3 is followed in each case by a curved region, wherein on the two curved regions a second optical element 5 each according to FIGS. 2a, 2b and 3 can be arranged. Thus, a light coupling into the light conductor 3 can take place on both sides.

The invention claimed is:

1. A lighting device (1) for a motor vehicle or for a motor vehicle headlamp system, the lighting device comprising:
   a light source (2) for producing and emitting light;
   a light conductor (3), wherein the light of the light source (2) is coupled into the light conductor (3) and decoupled on a decoupling surface of the light conductor (3), wherein the light conductor (3) comprises a first region (3a) and a curved region (3b) following the first region (3a), wherein the decoupling surface extends over the first region (3a) and the curved region (3b) and is formed in such a manner that the light rays, after the decoupling from the region (3a), are oriented parallel to one another;
   a first optical element (4) having a light entry surface, which comprises a first portion (4a) and a second portion (4b) adjoining the first portion, wherein the first optical element (4) is arranged relative to the light conductor (3) in such a manner that light, which is decoupled from the first region (3a) of the light conductor (3), impinges on the first portion (4a) of the light entry surface of the first optical element (4), and light, which is decoupled from the curved region (3b) of the light conductor (3), impinges on a part region of the second portion (4b) of the light entry surface of the optical element (4),
   wherein the lighting device (1) further comprises a second optical element (5), which is arranged between the curved region (3b) of the light conductor (3) and the second portion (4b) of the light entry surface of the first optical element (4) in such a manner and equipped in order to redirect light, which is decoupled from the curved region (3b) of the light conductor (3), in such a manner that the light, having passed through the second optical element (5), impinges on the entire second portion (4b) of the light entry surface of the first optical element (4),
   wherein the lighting device is configured such that substantially all light emitted from the curved region of the light conductor is emitted directly onto the second optical element,
   wherein the second optical element (4), on a surface (5a) facing the curved region (3b) of the light conductor (3), comprises entry optics which are equipped in order to redirect the light, which is decoupled from the curved region (3b) of the light conductor (3), in the direction of the second portion (4b) of the first optical element (4) upon entry into the second optical element (5), and
   wherein the second optical element (5), on a surface (5b) facing the first optical element (4), comprises exit optics configured to redirect the light, upon exiting the second optical element (5), in such a manner that the light rays exiting from the second optical element (5), are oriented parallel to the light rays decoupled from the first portion (3a) of the light conductor (3).

2. The lighting device (1) according to claim 1, wherein the first region (3a) of the light conductor (3) and the first portion (4a) of the first optical element (4) are oriented substantially parallel to one another.

3. The lighting device (1) according to claim 1, wherein the light rays, after the decoupling from the light conductor (3), are oriented orthogonally to the first region (3a) of the light conductor (3) and/or orthogonally to the light entry surface (4a, 4b) of the first optical element (4).

4. The lighting device (1) according to claim 1, wherein light, which is decoupled from the first region (3a) of the light conductor (3), exclusively impinges on the first portion (4a) of the light entry surface of the first optical element (4).

5. The lighting device (1) according to claim 1, wherein the second optical element (5) is configured substantially prism-like, wherein a first surface of the prism faces the curved region (3b) of the light conductor (3) and a second surface of the prism of the light entry surface faces the second portion (4b) of the first optical element (4).

6. The lighting device (1) according to claim 1, wherein the light conductor (3) and the second optical element (5) are spaced apart from one another and/or the first optical element (4) and the second optical element (5) are spaced apart from one another.

7. The lighting device (1) according to claim 1, wherein a surface (5a) of the second optical element (5) facing the light conductor (3) has a curvature which is substantially equal to the curvature of the curved region (3b) of the light conductor (3).

8. The lighting device (1) according to claim 1, wherein a surface (5b) of the second optical element (5) facing the first optical element (4) is oriented substantially parallel to the light entry surface (4a, 4b) of the first optical element (4).

9. The lighting device (1) according to claim 1, wherein the first optical element (4) is configured to produce a light function.

10. The lighting device (1) according to claim 9, wherein the light function is a signal light function.

11. The lighting device (1) according to claim 1, wherein the second optical element (5) is formed as a transparent solid body.

12. The lighting device (1) according to claim 1, wherein the curved region (3b) of the light conductor (3) and the second optical element (5) are formed in one piece.

13. A motor vehicle headlamp system, including at least one motor vehicle headlamp and a lighting device (1) according to claim 1.

14. The motor vehicle headlamp system according to claim 13, wherein the light conductor (3) of the lighting device (1) has a first and a second end, wherein at each end light is coupled into the light conductor (3) by means of a light source.

15. The motor vehicle headlamp system according to claim 13, which comprises two motor vehicle headlamps, wherein the lighting device (1) is arranged between the two motor vehicle headlamps.

* * * * *